United States Patent [19]

Koberstein et al.

[11] 4,034,060

[45] July 5, 1977

[54] EXHAUST GAS PURIFYING CATALYST AND PROCESS OF MAKING AND USING SAME

[75] Inventors: Edgar Koberstein, Alzenau; Eduard Lakatos, Grossenhausen, both of Germany

[73] Assignee: Deutsche Gold- und Silber-Scheideanstalt vormals Roessler, Frankfurt am Main, Germany

[22] Filed: May 13, 1976

[21] Appl. No.: 685,958

Related U.S. Application Data

[60] Continuation of Ser. No. 567,776, April 14, 1975, abandoned, which is a division of Ser. No. 406,075, Oct. 12, 1973, Pat. No. 3,928,238.

Foreign Application Priority Data

[30]

Oct. 13, 1972 Germany .......................... 2250200

[52] U.S. Cl. .......................... 423/213.5; 423/239; 423/247
[51] Int. Cl.² .................. C01B 21/20; C01B 31/18
[58] Field of Search ................ 423/213.5, 239, 247

[56] References Cited

UNITED STATES PATENTS

| | | | |
|---|---|---|---|
| 3,410,651 | 11/1968 | Brandenburg et al. | 423/213.2 |
| 3,444,099 | 5/1969 | Taylor | 423/213.5 X |
| 3,513,109 | 5/1970 | Stiles | 252/465 |
| 3,785,998 | 1/1974 | Hoekstra | 423/213.5 |
| 3,881,696 | 5/1975 | LePeytre et al. | 423/213.5 X |
| 3,899,444 | 8/1975 | Stephens | 423/213.5 X |
| 3,928,238 | 12/1975 | Koberstein et al. | 252/465 |

*Primary Examiner*—Helen M. McCarthy
*Attorney, Agent, or Firm*—Beveridge, DeGrandi, Kline & Lunsford

[57] ABSTRACT

A process for preparing an oxidic, carrier catalyst comprising at least one heavy metal compound as active component, said process comprising providing a carrier comprising a temperature resistant material with a catalytically active coating by intensively mixing said carrier with a binding agent, and at least one pulverulent, oxidic heavy metal compound or with a pulverulent mass containing at least one of said oxidic heavy metal compounds or at least one hydroxyl group-containing precursor of said heavy metal compounds, and subsequently heating the resulting mass to remove said binding agent. The catalyst and the process of using the catalyst in the purification of exhaust gases are provided.

15 Claims, 1 Drawing Figure

U.S. Patent        July 5, 1977        4,034,060
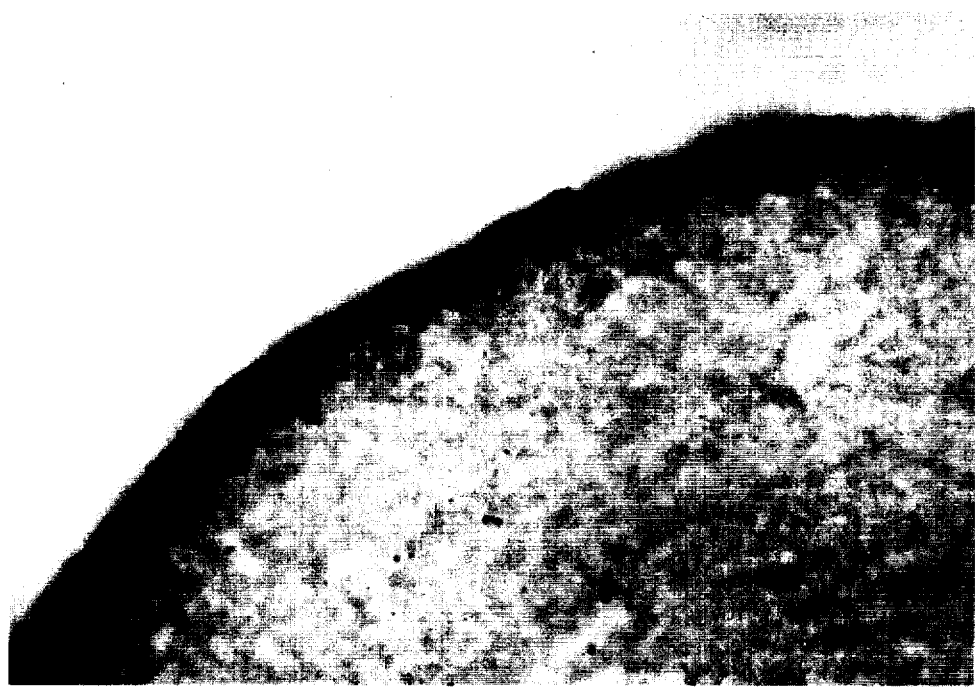

EXHAUST GAS PURIFYING CATALYST AND PROCESS OF MAKING AND USING SAME

This is a continuation, of application Ser. No. 567,776 filed Apr. 14, 1975 which, now abandoned is a division of Ser. No. 406,075, filed Oct. 12, 1973, now U.S. Pat. No. 3,928.238

The present invention relates to a process for producing an oxidic, carrier catalyst containing heavy metal compounds as the active components, and being intended for the purification of exhaust gases from vehicles and industrial plants.

In catalytic exhaust gas purification, it is necessary to use catalysts which retain their initial activity over long periods of time. Conventional supported catalysts, more particularly, catalysts having a heavy metal impregnation on an aluminum oxide carrier, are subject to the disadvantage that the influence of high temperatures can produce a solid body reaction between the heavy metal components and the carrier material, resulting in a considerable reduction in the efficiency of the catalyst (See U.S. Pat. No. 3,669,906). A $\gamma$-aluminum oxide support can be impregnated with copper/chromium/barium salts, subsequently calcined, and then used as an exhaust gas purification catalyst for vehicles. At highoperating temperatures or over long operating periods, however, the copper oxide portion of the catalyst interacts with the aluminum oxide of the supporting agent to form catalytically inactive Spinell $CuAl_2O_4$. The higher the aluminum oxide concentration in the heavy metal oxide, the more rapid the increase in the inactivity associated therewith. However, a reduction in the aluminum oxide concentration in the surface of the catalyst by the application of a higher proportion of the catalytically active heavy metal components, results in suppoted catalysts which are not sufficiently resistant to mechanical stress, more particularly to wear by rubbing.

Catalytic bodies which are substantially unsupported by a carrier and which consist largely of a catalytically active mass (hereinafter referred to as full contact catalysts), do not have these disadvantages, but they are subject to other technical and economic disadvantages by reason of their high specific weight. As a result, catalyst containers and mountings in vehicles have to be oversized. As the catalytic action takes place chiefly on the surface of the catalyst, the inner part of the catalyst particles remain unused in the case of full contact catalysts. A further disadvantage of the full contact catalysts consists in that, owing to their high bulk density, the heating time of a specific catalyst volume is substantially longer than that of a carrier catalyst having a low bulk density.

It is therefore necessary to obviate the disadvantages of the carrier, catalysts, particularly their tendency to undergo the above-mentioned solid reactions, and to effectively combine their advantages with those of the full contact catalysts.

Accordingly, this invention provides a process for producing an oxidic, carrier catalyst containing at least one heavy metal compound as the active component, and being intended for purifying the exhaust gases from vehicles and industrial plants.

In the process of this invention, a carrier comprising a temperature-resistant material is provided with a catalytically active coating by intensively mixing the carrier with at least one separately produced pulverulent, oxidic, heavy metal compound or with a pulverlent mass containing at least one of these compounds or at least one of their precursors containing a hydroxyl group, using a binding agent, and removing the binding agent by heating. Removal of the binding agent takes place by heating at temperatures above about 300° C., preferably about 350° – 800° C., especially about 450° – 600° C.

This invention also provides an improved exhaust gas purifying catalyst comprising at least one heavy metal oxide, alkali metal, alkaline earth metal and optionally at least one noble metal or aluminum oxide. The improved catalyst comprises a shaped core of temperature-resistant support material having a coating of separately prepared catalytically active material. At least 50% by weight of the catalytically active material is selected from at least one heavy metal oxide or modified heavy metal oxide. The support material and catalytically active material are in a weight ratio of about 4 – 30:1, and are without substantial mutual permeation. Preferably, the ratio of support material to catalytically active material is about 7 – 15:1.

This invention further provides a process for purifying an exhaust gas comprising contacting the exhaust gas with the catalyst of this invention.

The FIGURE is a sectional view through a catalyst body of this invention (enlargement = 100:1) prepared according to Example 1.

Preferably, the exhaust gas is from a vehicle or industrial plant, especially one containing at least one hydrocarbon, carbon monoxide, nitrogen oxide or mixtures of these gases. In a preferred embodiment, a vehicle exhaust gas containing at least one hydrocarbon, carbon monoxide, nitrogen oxide or mixtures thereof is contacted with a catalyst of this invention to substantially remove these enumerated gases by oxidation, reduction or both oxidation and reduction.

According to a preferred embodiment of the invention, the carrier is treated with the binding agent, the mixture thus obtained is agitated until the surface of the carrier is slightly glutinous, and the pulverulent compounds are then applied thereto. The particle size of the pulverulent components is preferably less than about 100 $\mu$ m.

The preferred carrier material is aluminum oxide, hollow bodies produced therefrom or aluminum oxide fibers. However, it is also possible to use as a carrier material, oxidic aluminum and silicon compounds, for example, an aluminosilicate or mullite. Additionally, the following oxides can be employed: beryllia, thoria, zirconia, magnesia, or combinations of these oxides, such as boria-alumina. Typical of the silicon compounds and oxidic aluminum compounds are: $\alpha$-$Al_2O_3$, $\alpha$-quartz, cordierite, mullite, zirconia, silicon nitride $Si_3N_4$, and silicon and carbide SiC. Chargeable, rounded particles of about 1–10 mm, and preferably about 2–6 mm in diameter are advantageously used. Typical shapes are spheres, tablets, pellets and briquettes.

To treat the carrier material with the binding agent, intensive mixing of the two components must take place. Rolling, for example, on a rotary plate, has been found to be a particularly advantageous mixing method. Other mixing devices, such as a rotary drum, can be used if intensive rubbing of the carrier is desired.

Known catalytically active, oxidic, heavy metal compounds can be used as the active components of the catalyst. According to a preferred embodiment of the invention, oxides of the heavy metals, copper, chromium, nickel, titanium, vanadium, manganese, iron, cobalt and zinc, optionally doped with at least one alkali metal (i.e., a metal from Group IA of the Periodic Table) or at least one alkaline-earth metal (i.e., a metal from Group IIA of the Periodic Table), are used as active components. Catalysts composed in this way can be produced by sintering from the oxides or by co-precipitation from the salts of the heavy metals. Other oxygen-containing metal compounds include the ferrites, stannates, cerates, molybdates, tungstates, vanadates, chromates, chromites and manganates. Examples of other heavy metals are: tin, molybdenum, tungsten, and bismuth, the oxidic compounds of which can be employed in this invention. The introduction of the alkali or alkaline-earth metals stabilizes the creep resistance of the phases of the heavy metal oxides or their compounds.

Particularly suitable as active catalyst components are mixed catalysts composed of catalytically active oxidic, heavy metal compounds and a binding agent. According to an advantageous variant of the invention, a mixture of aluminum hydroxide and cuprou chromium oxide, which is doped with barium, is calcined. After the calcined mixture is impregnated with an aqueous nickel salt solution, it is again calcined. The resulting product is then employed as the active component.

It is not necessary for the active components to be applied to the carrier as a prepared catalyst. Good results are also obtained when a precursor of the active component containing a hydroxyl group is used. The hydroxides are contemplated for this purpose. For example, a mixture of aluminum hydroxide with cuprous chromium oxide doped with barium which has been impregnated with an aqueous nickel salt solution, dried and ground, can be used as the precursor of the active component. Further, the calcining process required to produce the prepared catalyst is combined with the equally necessary step for removing the binding agent. Instead of impregnating the above mixture with a nickel salt solution, it is possible to incorporate the nickel into the precursor of the active component by co-precipitation. In this case, the process involves employing as the precursor of the active component, co-precipitated hydroxides of copper, chromium, and nickel, optionally doped with alkaline-earth metal, in a mixture of aluminum hydroxide, dehydrated aluminum hydroxide, or $\gamma$-aluminum oxide, and in combining the calcining process and the step for removing the binding agent. When calcination and removal of binder are combined in a single heating step, heating temperatures lie below the temperatures employed for calcination only, and can be determined with a minimum of experimentation. Preferably, the precursor of the active component is a co-precipitated basic oxide of manganese, iron and chromium, optionally doped with an alkaline earth metal in a mixture with aluminum hydroxide gel, dried aluminum hydroxide or eta, gamma - aluminum oxide. Since the catalytically active binder and heavy metal compounds form the active catalyst, it is to be understood that this invention contemplates the use of either or both of two types of precursors: a hydroxyl group - containing precursor of the binding agent [e.g., Al(OH)$_3$], and a hydroxyl group-containing precursor of the heavy metal oxide.

Beside the nitrate of nickel, one can also employ a sulfate, chloride, bromide, acetate, carbonate, oxalate, tartrate or perchlorate of nickel.

In order to obtain the advantages of the full contact catalyst, it has proved advantageous for the active component to consist of at least 50% by weight heavy metals. The oxidic heavy metal compounds can be present in modified form. A particularly effective catalyst system is obtained when a solution of a salt of one or more of the following metals: palladium, platinum, rhodium, iridium and ruthenium, is used as the impregnated active component or its precursor; the impregnation is subsequently converted to catalytically active metal and/or metal oxide. Conversion to free metal takes place by calcination or reduction of the salts with aqueous reducing agents, for example, formic acid, sodium borate, hydrazine, etc. or with gaseous reducing agents, such as hydrogen. Conversion into metal oxide can be accomplished, for example, by treating the salt with an $H_2O_2$ solution as described in Example 4, or by calcination in an oxygen atmosphere.

Special demands are placed on the liquid binding agent to be used. It must be capable of providing the surface of the carrier with a slightly glutinous layer by dissolution or absorption. Thus, one can use as the binding agent tackifiers or solvents which at the same time make the dissolved substance sticky. Organic and inorganic acids can be employed. Glacial acetic acid, lacetic acid, glycolic acid, succinic acid, nitric acid, polyvinyl alcohol, and propylene glycol have been found to be particularly suitable as binding agents. Also methyl cellulose, gum arabic, tragacanth and adhesives of all types diluted with solvents can be employed. The requisite amount of binding agent is a function of the absorptive capacity of the carrier in question. The amount of binding agent to be added is proportioned in such a manner that the carrier does not form lumps until the surface is sufficiently glutinous. This can be determined with a minimum of experimentation.

Particularly good adhesion of the active components to the carrier can be obtained if aluminum salts, thermally decomposable below 500° C., are added to the binding agent. Examples of such compounds are aluminum nitrate, aluminum hydroxide, aluminum oxyhydrate; salts of organic acids, for example, formate, acetate, lactate and acetylacetate; and other complex or chelate compounds of aluminum. The weight ratio of the carrier material to the active component can be in the region of about 4–30:1, and preferably about 7–15:1.

The catalysts of this invention are essentially catalysts having a full contact as their active component. In contrast to supported catalysts obtained by an impregnation process, the catalytically active component in the catalyst of this invention is substantially completely separate from the carrier material. The undesirable solid body reactions between the active component and the carrier material do, therefore, not take place. Accordingly, it is possible to use a relatively small amount of catalytically active material, and yet obtain the advantages of full contact catalysts.

Another advantage of the catalyst of this invention is the considerable weight reduction when using a carrier of low bulk weight, which permits the use of lighter catalyst containers and mountings in mobile exhaust gas purifying units. A further advantage is the substantially reduced heating time as compared to full contact catalysts. This reduced heating time is especially important in catalytic exhaust gas purifying devices for vehicles.

This invention also provides an exhaust gas purifying catalyst obtainable from the above process. This catalyst comprises oxidic, heavy metal compounds, optionally containing alkali- and alkaline earth metal and/or noble metal and aluminum oxide, as active component. The catalyst comprises a premolded core of temperature-resistant carrier material and a coating of the separately produced active component. The active component contains at least 50% by weight of one or more, optionally modified, heavy oxides or oxidic heavy metal compounds. The ratio of the weight of the carrier material to the active component is about 4 – 30:1, and preferably about 7 – 15:1, there being substantially no mutual permeation.

The invention further relates to the use of the catalysts of this invention for purifying the exhaust gas from vehicles and industrial plants, especially for removing hydrocarbon, carbon monoxide and nitrogen oxide from motor vehicle exhaust gas by oxidizing or reducing measures.

The invention will now be described in more detail by way of examples with reference to the accompanying Figure.

EXAMPLE 1

1. Production of the Active Component 165 kg Al (OH)$_3$ briquettes having a solids content of 9% are mixed for 3 hours in a Pfeiderer pug and kneading machine with 34.6 kg curpous chromium oxide doped with Ba. The resulting viscous paste is applied in a thin layer to Al sheets and dried for 12 hours in a drier at 95° – 100° C. After crushing in a Pfeiderer mill, the resulting dried briquettes are ground in a Fryma mill to a grainsize of less than 50μ.

30 kg of the finely ground powdered material are further ground and mixed for 20 min. in a pug mill with the addition of 12.4 l diluted HNO$_3$ (1295 ml HNO$_3$, $\gamma$ = 1.3), and formed into extrusion pressed bodies in a Hutt press. The pressed bodies are tempered at 500° C., and subsequently impregnated with a Ni(NO$_3$)$_2$·6H$_2$O solution. 5.7 kg pressed bodies are saturated with 1710 ml of a solution containing 1775.8g Ni(NO$_3$)$_2$·6H$_2$O, then dried at 120° C. and subsequently tempered at 450° C. The resulting material in then shaken, filtered and treated with a solution containing 190 ml concentrated NHO$_3$. It is then dried at 120° C., and again tempered at 500° C.

The catalyst obtained contains 70% by weight heavy metal oxide with a content of 8% BaO and 30% by weight Al$_2$O$_3$.

It will be understood that the HNO$_3$ is employed for its customary purpose as a peptizing agent. Similarly, the graphite serves its well known function as a molding agent.

2. Coating 20 kg aluminum oxide pellets, 2 – 4 mm in diameter, type SCS 79 of the firm PECHINEY bulk weight 0.7 kg/l.) are poured onto a 1.2 m in diameter rotary plate inclined at an angle of 60°, and agitated. (The angle of inclination of the rotary plate is a function of the amount of material placed thereupon and is between 50° and 75°). The rotational speed of the plate is, in this case, a constant 35 r.p.m. An 80% aqueous lactic acid solution is then added in a thin stream at a rate of ca. 0.2 liters per min., at which rate the carrier does not clog. A total of 2.8 l of the 80% aqueous lactic acid solution is used. The Al$_2$O$_3$ pellets now have a slightly glutinous surface. While continuing the rotational movement, 2 kg of the pulverulent cuprous chromium oxide-aluminum oxide full contact which has been doped with barium and subsequently calcined and possesses an inner particle size of <75μm, is added thereto in portions. After approximately 1 hour, a 0.2 mm thick, rigidly adhering layer of the full contact has formed on the Al$_2$O$_3$ pellets. The coated carrier is dried in air for 3 hours at 180° C., and subsequently heated in air at 450° for 1 hour. 8.1 kg glacial acetic acid can also be used instead of the lactic acid.

EXAMPLE 2

1. Production of the Active Component 150 kg aluminum hydroxide briquettes having a solids content of 10% are mixed in a Pfleiderer pug and kneading machine for 3 hours with 18.3 kg cuprous chromium oxide, and are dried in a paddle drier. 30 kg of the pulverulent material obtained are impregnated with 10.8 l of an aqueous solution containing 9.7 kg Ni(NC$_3$)$_2$·6H$_2$O, and subsequently dried in air at 110° C. The catalyst contains 55% by weight heavy metal oxide and 45% aluminum oxide.

2. Coating 20 kg aluminum oxide pellets, 3 – 5 mm in diameter, type SAS of the firm KAISER ALUMINUM (bulk weight 0.45 kg/l) are treated according to the process of Example 1 with 23.2 l of an 8% nitric acid solution, and subsequently coated with 3 kg of a pulverulent mixture of cuprous chromium oxide and aluminum hydroxide doped with Ba, and subsequently impregnated with Ni-salt and having a particle size range of 10 – 50 μm. The process is then continued according to Example 1. A temperature of 550° C. is used in the final calcining operation.

EXAMPLE 3

25 kg of pellets are extruded to a diameter of 3 mm and a length of ca. 8 mm. The extruded pellets exhibit the radiographic phase α-Al$_2$O$_3$, mullite and α-quartz, and have a surface area of 9.5 m$^2$/g and a pore volume of 0.2 g/cm$^3$. The extruded pellets are treated according to the process of Example 1 with 5.6 l of a 57% glycolic acid solution containing 1.4 kg Al(NO$_3$)$_3$·9-H$_2$O, and then coated with 2.5 kg of lithium-doped tricobalt tetraoxide (CO$_3$O$_4$). The cobalt oxide is produced as follows:

7 kg Co(NO$_3$)$_2$·6H$_2$O are dissolved in 50 l water, and then precipitated out at pH 8.5 with ca. 20 l LiOH solution containing 1.5 kg 98% LiOH. The precipitate is then washed and suspended in 40 l 10% H$_2$O$_2$ solution. The mixture is subsequently evaporated on a water bath, dried at 120° C., ground and tempered for 3 hours at 600° C. The catalyst material obtained has a maximum particle size of 59 μm.

EXAMPLE 4

1. Production of the Active Component 10 kg of the catalyst material from Example 1 are impregnated with 2.8 l of an aqueous solution containing 31 g K$_2$PdCl$_4$ and 56 g K$_2$CO$_3$. The solution containing the noble metal salt and the potassium carbonate is produced only shortly before the impregnation from separately prepared solutions. The impregnated material is dried in air at 120° C. The dried product is treated for 0.5 hours with 75 l water containing 350 ml of a 35% hydrogen peroxide solution. The material is subsequently dried in air, an then calcined in air at 400° C. for 0.5 hrs.

2. Coating Operation 20 kg of hollow pellets consisting essentially of α-aluminum oxide, produced by the firm GERALCO, having a bulk density of 0.425 g/l and a 3-5 mm diameter, are treated according to the process of Example 1 with a 4.3 kg of an 8% polyvinyl alcohol solution and are coated with 1.5 kg of the catalyst from Example 1 which has been doped with 0.2% by weight Pd as PdO.

EXAMPLE 5

10 kg aluminum oxide molded fiber bodies having a bulk weight of 0.35 kg/l and made from a fiber product of the firm Societe Generale Des Produits Refractaries, and having dimensions of between 3 and 5 mm, are treated according to the process of Example 1 with 2.7 kg polypropylene glycol having a molecular weight of about 500, and subsequently coated with 1 kg of a catalyst mass produced in the following manner:

a. 6.86 kg ammonium dichromate are dissolved in 32.6 l $H_2O$, and 9.1 l of 25% ammonia are added. This solution is added to a solution of 13.66 kg $Mn(NO_3)_2 \cdot 4H_2O$ in 21.8 l $H_2O$, heated to ca. 50° C. while being constantly stirred. The precipitate obtained is heated to 50° C. under constant stirring and then washed by decanting and filtering.

b. 4.61kg ammonium dichromate are dissolved in 22 l $H_2O$, and 6.14 l 25% ammonia are added. This solution is added to a solution of 22.1 kg $Fe(NO_3)_3 \cdot 9H_2O$ in 14.9 l $H_2O$ heated to 50° C. with constant stirring. The precipitate obtained in heated to ca. 50° C. with constant stirring, and is washed by decanting and filtering.

c). The precipitates from a) and b) are introduced into ca. 50 l $H_2O$ and spun. The suspension is filtered after decanting. The moist extruded body is homogenized in a kneading machine with 181 kg $Al(OH)_3$-filter pellets, the solids content of which amounts to 9%. The viscous paste is dried in a paddle drier, and ground to a particle size of less than 50 μm.

EXAMPLE 6

The mechanical properties of the catalysts produced according to Examples 1 - 5 are examined. Wear by rubbing and contraction are chosen as the criteria, and these are measured by the following methods:

a. Wear by Rubbing:

200 kg of the catalyst are agitated in a 1.25 l glass container for 1 hour in a shaking machine (Turbula mixer). The material is subsequently fractionated through a DIN 6 filter, and the wear by rubbing is calculated in % by weight from the residue as compared to the initial weight.

b. Contraction 250 ml of the material to be tested are tempered for 24 hours at 870° C. in a current of air, and subsequently the loss in volume is examined.

The values obtained are listed in the following table.

The values for comparative examples indicated in this table relate to supported catalyst (Comp. Example 1), in this case a $\gamma$-$Al_2O_3$ pellet material impregnated with 10% cuprous chromium oxide, and a full contact catalyst (Comp. Example 2) produced from a cuprous chromium oxide - aluminum oxide mixture according to West German patent 20 18 378.2. Both of these are used as purifying catalysts for industrial and vehicle exhaust gases. The values show that the catalysts according to this invention do not lag behind supported catalysts and full contact catalysts with regard to contraction and wear by rubbing.

Table 1

| Catalyst Type | Contraction (%) | Wear (%) |
|---|---|---|
| Example 1 | 2.1 | 3.6 |
| Example 2 | 6.2 | 3.0 |
| Example 3 | 0.8 | 3.2 |
| Example 4 | 0.3 | 4.9 |
| Example 5 | 5.8 | 3.2 |
| Comp. Example 1 | 5.9 | 3.8 |
| Comp. Example 2 | 2.8 | 2.3 |

EXAMPLE 7

To test their catalytic efficiency, the catalysts produced according to Examples 1 - 5 are introduced into testing apparatus consisting of a mixing and proportioning zone for producing a test gas mixture, a reaction tube arranged in a tube furnace, and an analysis section. To produce the test gas mixture, the gases are removed from pressurized bottles, withdrawn in suitable amounts by a rotameter and mixed in a mixing vessel containing packing.

The mixed gas produced is then conveyed to the reaction zone, whereupon control of the gas being charged is effected by taking samples via a by-pass line. The pressure drop along the bulk material reactor can be measured by means of manometers. The temperatures of the furnace and reaction zones in the catalyst charges are measured by means of sheathed thermocouples inserted centrally into the reaction pipe, and are registered continuously on a recorder.

The gas is conducted into a reaction gas distributor. The determination of CO and $O_2$ is effected gas chromatographically. A flame ionization detector is used to determine the hydrocarbon. The following test gas mixture was employed:

1.5 vol % $H_2$
3.0 vol % CO
0.5 vol % $C_3H_6$
5.4 vol % $O_2$
Remainder $N_2$

The volumetric flow rate is 40,000 Nl/hour$^{-1}$ catalyst:

Catalyst temperature is 500° C.

The results employing the catalysts of this invention and of the two comparative samples are set forth in Table II Table II

| Catalytic Efficiency of Catalyst Sample | | | | |
|---|---|---|---|---|
| Reaction temperature 500° C., GHSV (Gas Hourly Space Velocity) 40,000 h$^{-1}$ | | | | |
| | Catalyst Conversion | | | |
| | Fresh Catalyst | | Aged Catalyst | |
| Catalyst type | CO (%) | $C_3H_6$ (%) | CO (%) | $C_3H_6$ (%) |
| Example 1 | 100 | 87 | 99 | 83 |
| Example 2 | 99 | 89 | 98 | 86 |
| Example 3 | 96 | 98 | 96 | 90 |
| Example 4 | 100 | 99 | 100 | 95 |
| Example 5 | 98 | 84 | 97 | 80 |
| Comparative Example 1 (supported catalyst) | 100 | 88 | 85 | 69 |
| Example 2 (full contact | | | | |

Table II-continued

Catalytic Efficiency of Catalyst Sample
Reaction temperature 500° C., GHSV (Gas Hourly Space Velocity) 40,000 h⁻¹

| Catalyst type | Catalyst Conversion | | | |
|---|---|---|---|---|
| | Fresh Catalyst | | Aged Catalyst | |
| | CO (%) | $C_3H_6$ (%) | CO (%) | $C_3H_6$ (%) |
| catalyst) | 99 | 88 | 99 | 86 |

The conversion rates obtained with freshly produced and aged catalyst samples are listed. The ageing of the catalyst is efected by tempering the sample in air for 24 hrs. at 870° C.

The values show that with the catalysts of this invention, the temperature stability of a full contact catalyst is achieved, whereas the aged supported catalyst of the prior art is subject to a decrease in efficiency.

EXAMPLE 8

The bulk densities of the catalysts described in Examples 1 – 5 are determined and compared with the catalysts of the comparative examples using a stamp volumeter. The results are shown in Table III.

Table III

| Catalyst Type | Bulk Volume (kg/l) |
|---|---|
| Example 1 | 0.71 |
| Example 2 | 0.45 |
| Example 3 | 1.12 |
| Example 4 | 0.71 |
| Example 5 | 0.36 |
| Comparative Example 1 (Supported Catalyst) | 0.70 |
| Comparative Example 2 (Full Contact Catalyst) | 1.35 |

The values in Table III show the advantages of the catalysts produced according to this invention over the full contact catalysts. The bulk density of these catalysts is lower, and is some cases, considerably lower than that of the full contact catalysts, and they achieve the values of the supported catalysts.

What is claimed is:

1. A process for purifying an exhaust gas comprising contacting said exhaust gas with a catalyst comprising at least one heavy metal oxide, alkali metal, alkaline earth metal and optionally noble metal or aluminum oxide, said catalyst comprising a shaped core of temperature-resistant support material having a coating of catalytically active material, at least 50% by weight of the active material being at least one heavy metal oxide or modified heavy metal oxide, wherein said heavy metal is selected from the group consisting of copper, chromium, nickel, titanium, vanadium, manganese, iron, cobalt, zinc, tin, molybdenum, tungsten and bismuth; said support material and catalytically active material being in a weight ratio of about 4 – 30 : 1 and being without substantial mutual permeation due to said core having been intensively mixed with a binding agent until the surface of said core is slightly glutinous and thereafter having been intensively mixed with a pulverulent catalytically active material or with a hydroxyl group-containing precursor of the catalytically active material and the resulting mass having been heated to remove the binding agent.

2. A process according to claim 1 in which the particle size of the pulverulent component is less than about 100 μm.

3. A process according to claim 1 in which the core is comprised of aluminum oxide.

4. A process according to claim 3 in which the core is comprised of hollow bodies.

5. A process according to claim 3 in which the core is comprised of fibers.

6. A process according to claim 1 in which the core comprises particles of about 1 – 10 mm in diameter.

7. A process according to claim 1 in which the core comprises particles of about 2 – 6 mm in diameter.

8. A process according to claim 1 in which the catalytically active material is a calcined mixture of aluminum hydroxide with cuprous chromium oxide doped with barium, which has been impregnated with nickel salt and subsequently calcined.

9. A process according to claim 1 in which, as precursor of the catalytically active material, a dried and ground mixture of aluminum hydroxide with cuprous chromium oxide doped with barium, impregnated with nickel salt solution, is used, and the precursor is calcined while the binding agent is being removed.

10. A process according to claim 1 in which, as precursor of the catalytically active material, co-precipitated hydroxides of manganese, iron and chromium, optionally doped with alkaline-earth metal, in a mixture with aluminum hydroxide gel, dried aluminum hydroxide or η,γ-aluminum oxide, is used, and calcining of the precursor is combined with removal of the binding agent.

11. A process according to claim 1, in which the support material and active material, or its precursor, are used in a weight ratio of about 7 – 15 : 1.

12. A process according to claim 1 in which the exhaust gas is a vehicle or industrial plant exhaust gas.

13. A process according to claim 1 in which the exhaust gas comprises at least one hydrocarbon, carbon monoxide, nitrogen oxide or mixture thereof.

14. A process according to claim 1 in which said exhaust gas is a vehicle exhaust gas.

15. A process according to claim 14 in which at least one hydrocarbon, carbon monoxide, nitrogen oxide or mixture thereof is substantially removed from said exhaust gas by oxidation, reduction or both oxidation and reduction.

* * * * *